F. J. DRESIA.
CANE STRIPPER.
APPLICATION FILED NOV. 13, 1909.
951,237.
Patented Mar. 8, 1910.
2 SHEETS—SHEET 1.
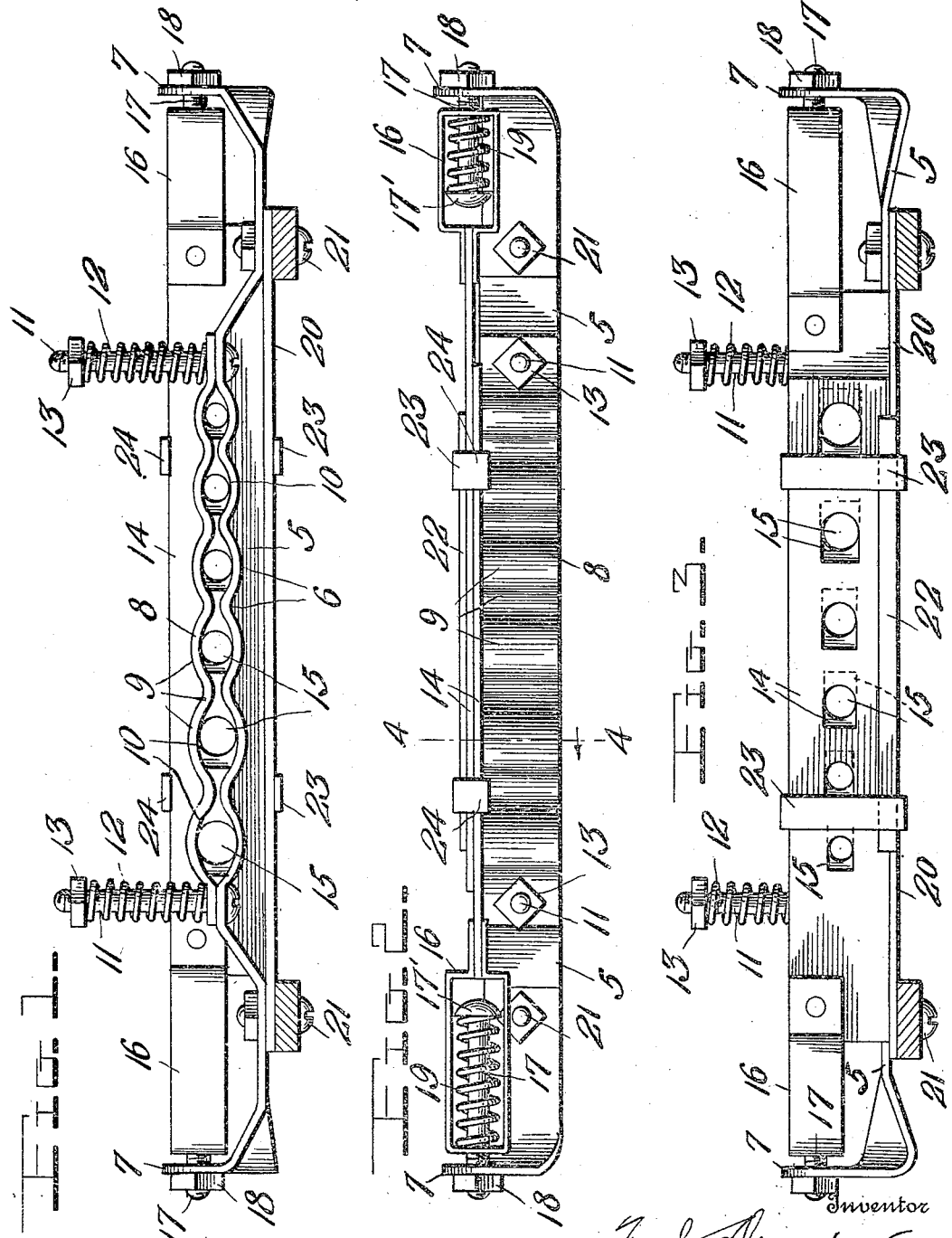
Witnesses
Chas. L. Griesbauer.
E. M. Ricketts.
Inventor
F. J. Dresia
By Watson E. Coleman
Attorney

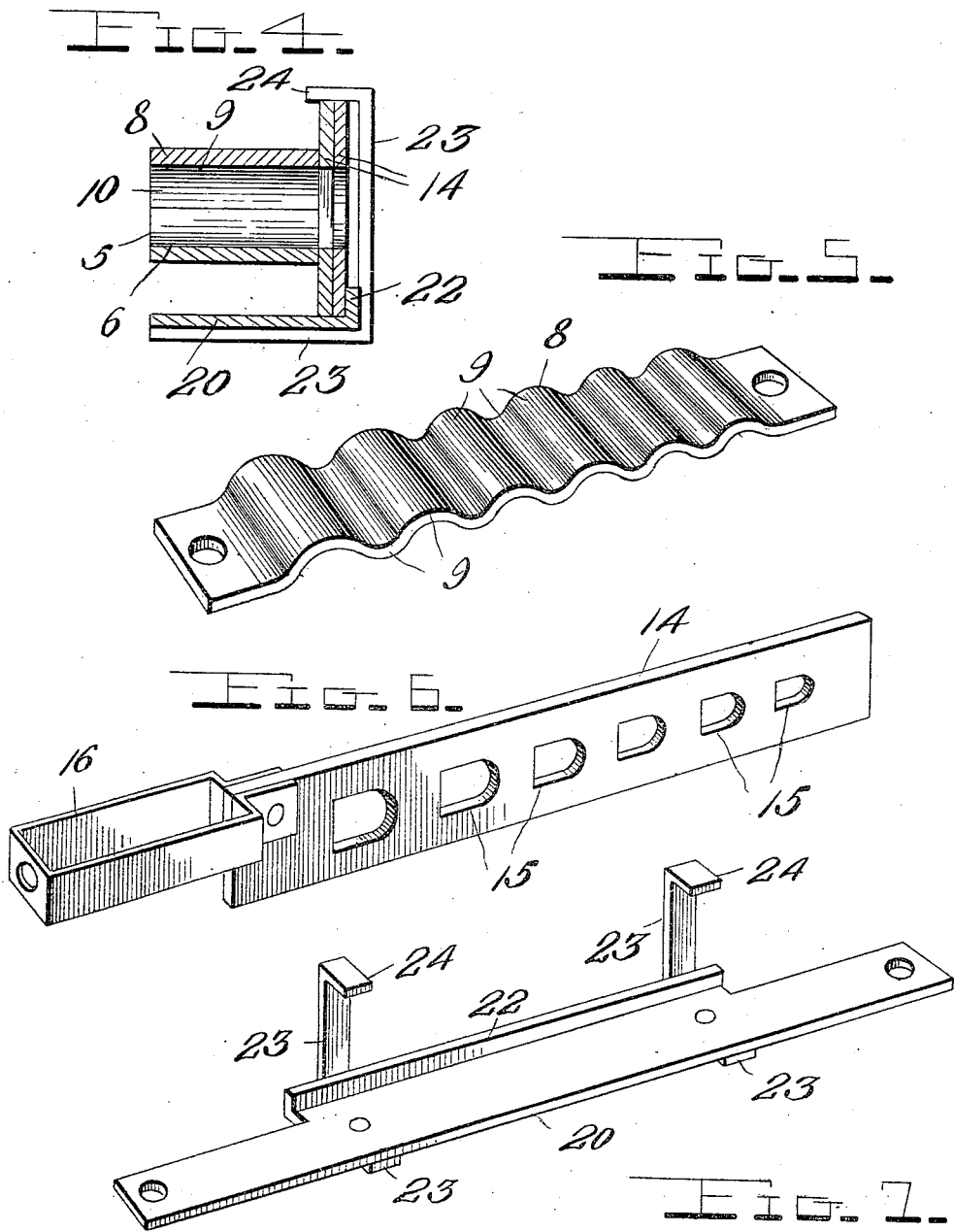

UNITED STATES PATENT OFFICE.

FRANK J. DRESIA, OF COLUMBUS, KANSAS.

CANE-STRIPPER.

951,237.  Specification of Letters Patent.  Patented Mar. 8, 1910.

Application filed November 13, 1909. Serial No. 527,954.

*To all whom it may concern:*

Be it known that I, FRANK J. DRESIA, a citizen of the United States, residing at Columbus, in the county of Cherokee and State of Kansas, have invented certain new and useful Improvements in Stalk-Strippers, of which the following is a specification, reference being had to the accompanying drawings.

This invention has relation to certain new and useful improvements in stripping devices of that character commonly employed for stripping the leaves from cane or tobacco stalks, and has for its object to provide a very simply constructed stripper whereby the work of stripping the stalks will be greatly facilitated.

Another object is to provide a device of the above character whereby stalks of various diameters may be conveniently stripped without requiring any adjustment of the various parts.

With these and other objects in view, the invention consists of the novel construction, combination and arrangement of parts, hereinafter fully described and claimed, and illustrated in the accompanying drawings in which, Figure 1 is a rear elevation of a stripper constructed in accordance with the present invention; Fig. 2 is a top plan view thereof; Fig. 3 is a front elevation; Fig. 4 is a transverse section taken on the line 4—4 of Fig. 2; Fig. 5 is a detail perspective view of one of the corrugated bars; Fig. 6 is a similar view of one of the stripping plates, and Fig. 7 is a detail perspective view of the guide plate.

Referring to the drawings, 5 indicates the lower stalk guiding bar which as shown at 6 is corrugated intermediate of its ends. These corrugations gradually increase in depth from end to end, and the bar 5 is downwardly bent beyond the corrugated portion thereof and has its ends angularly disposed as shown at 7. A top bar 8 is disposed upon the bar 5 and is likewise corrugated between its ends, as shown at 9. These corrugations also increase in depth and are disposed oppositely to the currugations of the bar 5 whereby substantially circular openings 10 are formed between the bars. As these openings vary in diameter it will be obvious that stalks of various sizes may be readily inserted between these bars. The opposite ends of the bar 8 are yieldingly held upon the bottom bar 5 by means of the bolts 11 which extend through these bars and have arranged thereon the spiral springs 12. The tension of these springs upon the ends of the bar 8 may be adjusted by means of the nuts 13 which are threaded upon the bolts.

Stripping plates 14 are disposed upon one side of the bars 5 and 8, and are yieldingly held for longitudinal movement. These plates are disposed upon one another and are provided with the substantially rectangular openings 15. These openings are adapted to be exposed in transverse alinement and the plates are movable upon the edges of the corrugated bars in opposite directions. One end of the openings 15 is rounded and when in operative position, these rounded ends are disposed opposite each other, whereby a substantially circular opening is provided, these openings also alining with the openings formed between the corrugated bars 5 and 8. A rectangular housing 16 is secured upon one end of each of the stripping plates. These housings are disposed between the angular extremities 7 of the base bar 5 and are provided in their ends with apertures through which the bolts 17 extend. These bolts are also movable through the ends of the base bar and nuts 18 are threaded thereon, whereby they may be conveniently adjusted. Between the inner headed ends 17' of each of the bolts and the outer end of the housings, a spiral spring 19 is positioned, the tension of this spring being regulated by the manipulation of the adjusting nuts 18. In this manner as the stalks are forced through the alined ends of the openings 15, the scraping action of the edge of these openings upon the stalks will cleanly remove the leaves therefrom, and if the pressure upon the stripping plates is greater than the size of the openings therein, the plates will be forced longitudinally upon each other to allow of the passage of the stalks therethrough. Thus the ends of the openings 15' are at all times held yieldingly in engagement with the stalks so that they may be cleanly stripped.

In order to guide the plates in their longitudinal movement I provide the plate 20 which is disposed upon the bottom of the base bar 5 beyond the corrugated portion thereof and may be secured thereto by means of the bolts 21 which are adapted to extend through a suitable base or foundation to which the stripper is secured. As clearly shown in Fig. 4 one of the longitudinal edges of this guide plate is flanged as at 22, such flanged portion extending upwardly over the lower edges of the stripping plates. Guide bars 23 are also secured to the bottom of the guide plate and extend upwardly over the outer stripping plate and have their extremities transversely disposed as shown at 24 over the upper edges of said plates, whereby the stripping plates will be securely held upon each other against vertical movement.

In operation, the stalks are inserted into the openings 15 formed in the longitudinally slidable plates 14. The operator will use his own judgment, according to the varying diameters of the stalks, as to which of these openings is of the most convenient size to receive the stalk and properly strip the same. The smaller or tapering ends of the stalks are first inserted into the openings in the plates, and forced through the openings 10 between the bars 5 and 8. As before stated, the adjustable tension springs 19 will engage the rounded ends of the openings 15' upon opposite sides of the stalk and as the stalk is forced through the stripping plates, the edges of the openings bear with increasing pressure upon the stalk, the stripping plates moving longitudinally upon each other against the tension of the springs.

The device may be operated by one or two persons, and it will be obvious that owing to the arrangement of the various elements, the stalks will be entirely denuded of their blades or leaves, and this refuse product may be used for cattle fodder or applied to other useful purposes.

While I have shown and described what I believe to be the preferred embodiment of my invention, it will be obvious that the device is susceptible of numerous minor alterations in the form, proportions and details of construction without materially departing from the spirit or sacrificing any of the advantages of the invention. The compactness and arrangement of the various elements are such that the device may be conveniently operated in a restricted space. The device constructed as above set forth may also be produced at a minimum cost and is very durable and highly efficient in its operation.

Having thus described the invention what is claimed is:

1. A device of the character described comprising opposed corrugated bars, the corrugations of said bars forming substantially circular openings between them, one of said bars being downwardly and outwardly extended beyond the ends of the other of said bars and having its extremities angularly disposed, bolts extending through said bars beyond the corrugations thereof, tension springs on said bolts, nuts threaded upon said bolts to regulate the tension of said springs and yieldingly hold the corrugated bars in opposed relation, stripping plates longitudinally movable upon each other at the edges of the bars having registering openings therein disposed in transverse alinement with the openings between the bars, and a base plate having spaced vertical guide bars extending upon the upper and lower edges of the stripping plates, substantially as and for the purpose set forth.

2. A device of the character described comprising opposed corrugated bars, the corrugations of said bars forming substantially circular openings between them, one of said bars extending beyond the ends of the other of said bars and having its extremities angularly disposed, means for yieldingly holding said bars in opposed relation, stripping plates longitudinally movable upon each other at the edges of the bars having registering openings therein disposed in transverse alinements with the openings between the bars, a housing secured to the outer end of each of said plates, bolts disposed through the angularly disposed extremities of the last named bar, said housings being movable on said bolts, a spring disposed upon each of said bolts between the end of the housing and the head of the bolt, whereby said plates are yieldingly held upon each other to normally register the openings therein, a base plate secured to one of said bars, and spaced vertically extending straps carried by said base plate extending over the face of the outer stripping plate, the lower edges of said plates resting upon said base plate, the upper ends of said straps being transversely disposed over the upper edges of said plates to guide the same in their longitudinal movement, substantially as and for the purpose set forth.

3. A device of the character described comprising opposed corrugated bars, the corrugations of said bars forming in effect circular openings between them, the ends of one of said bars extending beyond the ends of the other bar and disposed in angular relation thereto, longitudinally movable stripping plates provided with registering openings therein disposed in transverse alinement with the openings between the corrugated bars, a housing secured on one end of each of said plates beyond the opposite ends of the bars, a bolt extending through each of said housings and through the angular extremities of the bar, a tension spring disposed upon each of said bolts between the heads thereof and the end of the housing, adjusting nuts threaded on the outer ends of said blots engaged with the ends of the bar, and means for guiding the longitudinal movement of the plates, substantially as and for the purpose set forth.

4. A device of the character described comprising opposed corrugated bars yieldingly held upon each other, longitudinally movable stripping plates disposed upon each other at the edges of the bars and provided with rectangular openings therein having rounded ends, said rounded ends being opposed to each other, means for yieldingly holding the plates upon each other to provide apertures therethrough formed by the rounded ends of the openings which are of similar size and disposed in transverse alinement with the openings between the bars, a guide plate secured to the lower corrugated bar having one of its longitudinal edges flanged over the lower edges of the stripping plates and upon the outer face thereof, and guide bars secured to said plates extending upwardly over the face of the outer stripping plate and having their ends bent inwardly over the upper edges of said plates, substantially as and for the purpose set forth.

In testimony whereof I hereunto affix my signature in the presence of two witnesses.

FRANK J. DRESIA.

Witnesses:
J. M. McFARLAND,
M. MERIAUX.